(12) United States Patent
Moore

(10) Patent No.: US 9,381,662 B2
(45) Date of Patent: Jul. 5, 2016

(54) APPARATUS HAVING SCRAP-GUIDING REGIONS POSITIONED ON CUTTING ASSEMBLY

(71) Applicant: HONDA MOTOR CO., LTD., Tokyo (JP)

(72) Inventor: William Moore, Ontario (CA)

(73) Assignee: HONDA MOTOR CO., LTD., Tokyo (JP)

( * ) Notice: Subject to any disclaimer, the term of this patent is extended or adjusted under 35 U.S.C. 154(b) by 615 days.

(21) Appl. No.: 13/653,127

(22) Filed: Oct. 16, 2012

(65) Prior Publication Data

US 2014/0102273 A1 Apr. 17, 2014

(30) Foreign Application Priority Data

Oct. 12, 2012 (CA) ..................................... 2792162

(51) Int. Cl.
| | | |
|---|---|---|
| *B26D 7/18* | (2006.01) | |
| *B26D 7/06* | (2006.01) | |
| *B26D 1/09* | (2006.01) | |
| *B21D 24/16* | (2006.01) | |
| *B21D 45/00* | (2006.01) | |
| *B26D 1/00* | (2006.01) | |
| *B23D 31/00* | (2006.01) | |

(52) U.S. Cl.
CPC ........ *B26D 7/18* (2013.01); *B21D 24/16* (2013.01); *B21D 45/00* (2013.01); *B26D 1/09* (2013.01); *B26D 7/0641* (2013.01); *B23D 31/008* (2013.01); *B26D 2001/0066* (2013.01); *Y10T 83/0448* (2015.04); *Y10T 83/202* (2015.04); *Y10T 83/2209* (2015.04); *Y10T 83/2216* (2015.04)

(58) Field of Classification Search
CPC ........ B21D 45/00; B21D 45/003; B26F 1/38; B26F 1/14; B26F 1/3833; B26F 2001/44; B26D 7/18; B26D 7/0641; B26D 7/065; B26D 7/1845; B26D 2007/1881; Y10T 83/0448; Y10T 83/0467; Y10T 83/2074; Y10T 83/2081; Y10T 83/2083; Y10T 83/202; Y10T 83/2209; Y10T 83/2213; Y10T 83/2216; Y10T 83/2218; Y10T 83/8854; Y10T 83/9423; Y10T 83/9425; Y10T 83/9428; Y10T 83/9435; Y10T 83/9442; Y10T 83/9447
See application file for complete search history.

(56) References Cited

U.S. PATENT DOCUMENTS

| | | | |
|---|---|---|---|
| 3,039,343 A | 6/1962 | Richards | |
| 3,157,082 A | 11/1964 | Thompson | |
| 4,009,625 A | 3/1977 | Pfaff | |
| 4,543,722 A * | 10/1985 | Adleman et al. | ................ 30/360 |
| 4,607,553 A | 8/1986 | Hartzell | |
| 4,905,557 A * | 3/1990 | Adleman | ......................... 83/681 |
| 5,400,682 A * | 3/1995 | Matsuura | ......................... 83/49 |
| 5,499,566 A * | 3/1996 | Endo et al. | ...................... 83/636 |
| 5,988,032 A * | 11/1999 | Seki | .............................. 83/583 |
| 6,968,763 B2 | 11/2005 | Chapin et al. | |
| 7,210,384 B2 | 5/2007 | Elynuik | |
| 2005/0150338 A1* | 7/2005 | Elynuik | ........................... 83/13 |
| 2013/0276603 A1* | 10/2013 | Matsumura | ..................... 83/39 |

FOREIGN PATENT DOCUMENTS

| | | |
|---|---|---|
| JP | 6-218449 A | 8/1994 |
| JP | 6218449 | 8/1994 |

* cited by examiner

*Primary Examiner* — Phong Nguyen
(74) *Attorney, Agent, or Firm* — Standley Law Group LLP

(57) ABSTRACT

An apparatus, comprising a cutting assembly being configured to cut an object, and scrap-guiding regions being positioned on opposite sides of the cutting assembly.

7 Claims, 3 Drawing Sheets

APPARATUS HAVING SCRAP-GUIDING REGIONS POSITIONED ON CUTTING ASSEMBLY

CROSS-REFERENCE TO RELATED APPLICATIONS

As authorized by 35 U.S.C. §119, this application claims priority to and hereby incorporates by reference Canadian Application Serial No. CA2792162, titled APPARATUS HAVING SCRAP-GUIDING REGIONS POSITIONED ON CUTTING ASSEMBLY, filed on Oct. 12, 2012.

TECHNICAL FIELD

Embodiments of the invention generally relate to, but are not limited to, tools such as, but not limited to, cutting-tool systems and associated apparatus.

BACKGROUND

U.S. Pat. No. 4,607,553 discloses a punch having a hollow removable blade for punching an opening in a sheet of cardboard or other similar material. The blade has a beveled cutting edge about an inlet end. The diameter of the blade increases from the inlet end to the outlet end to prevent the slugs from becoming compacted in the blade.

U.S. Pat. No. 6,968,763 discloses an apparatus and method for orienting a part detached from a web of parts. The apparatus and method use a duct with at least one interior sloped side to orient the part in a substantially vertical orientation.

U.S. Pat. No. 7,210,384 discloses a punch and die tooling apparatus commonly used by metal fabricators for creating holes, passages and cavities in metal plate. The die has a unique internal bore which relieves the problem of slug pulling to ensure that a slug punched out of a metal sheet is not retained on the punch face to interfere with further operation of the apparatus.

SUMMARY

The inventor has researched a problem associated with known tool-cutting systems. After much study, the inventor believes he has arrived at an understanding of the problem and its solution, which is stated below.

Problems associated with the flow of scrap (cut pieces) may result in broken die assemblies that lead to production downtime and/or quality issues. From time to time, the flow of scrap pieces or cut pieces may be inconsistent and problematic due to the material properties of the scrap or cut pieces such as spring-back properties of the cut pieces. A higher amount of downtime (associated with known tool-cutting systems) is due to inconsistent flow of cut pieces as a result of or caused by variations in spring back of the material of the cut pieces resulting from residual stress released once the pieces are cut. That is, the cut pieces tend to flex and bounce around in unpredictable ways while the cut pieces are removed from the tool-cutting system. This problem results in occasional jamming of the cut pieces as they move, such as when the cut pieces move through a chute assembly for example.

For the case where the object that needs to be cut has or includes a profile (also called an addendum geometry), the problem associated with cutting of the object becomes even more evident or exacerbated.

What is needed is a tool-cutting system configured to guide the flow of scrap or cut portions in a more repeatable fashion (that is, avoid letting the cut pieces merely bounce off the chute assembly as the cut pieces are removed from the tool-cutting system.

In order to resolve (at least in part), the above mentioned issues, in accordance with an aspect of my work, I (the inventor) have developed and provided an apparatus, comprising: a cutting assembly being configured to cut an object; and scrap-guiding regions being positioned on opposite sides of the cutting assembly.

In order to resolve (at least in part), the above mentioned issues, in accordance with another aspect of my work, I (the inventor) have developed and provided a method comprising: cutting a first scrap portion from an object, the first scrap portion having a second scrap portion extending from the first scrap portion; cutting the second scrap portion from the object; and removing the second scrap portion cut from the object before removing the first scrap portion cut from the object.

In order to resolve (at least in part), the above mentioned issues, in accordance with another aspect of my work, I (the inventor) have developed and provided an apparatus comprising: first means for cutting a first scrap portion from an object, the first scrap portion having a second scrap portion extending from the first scrap portion; and second means for cutting the second scrap portion from the object; and third means for removing the second scrap portion cut from the object before removing the first scrap portion cut from the object.

In accordance with other aspects of my work, I (the inventor) have developed and provided other aspects as indicated in the claims.

In accordance with other aspects of my work, I (the inventor) have developed and provided other aspects as indicated in the Detailed Description of the Exemplary Embodiments.

Other aspects and features of the non-limiting embodiments may now become apparent to those skilled in the art upon review of the following detailed description of the non-limiting embodiments with the accompanying drawings.

BRIEF DESCRIPTION OF THE DRAWINGS

The non-limiting embodiments may be more fully appreciated by reference to the following detailed description of the non-limiting embodiments when taken in conjunction with the accompanying drawings, in which.

Figure 1A:
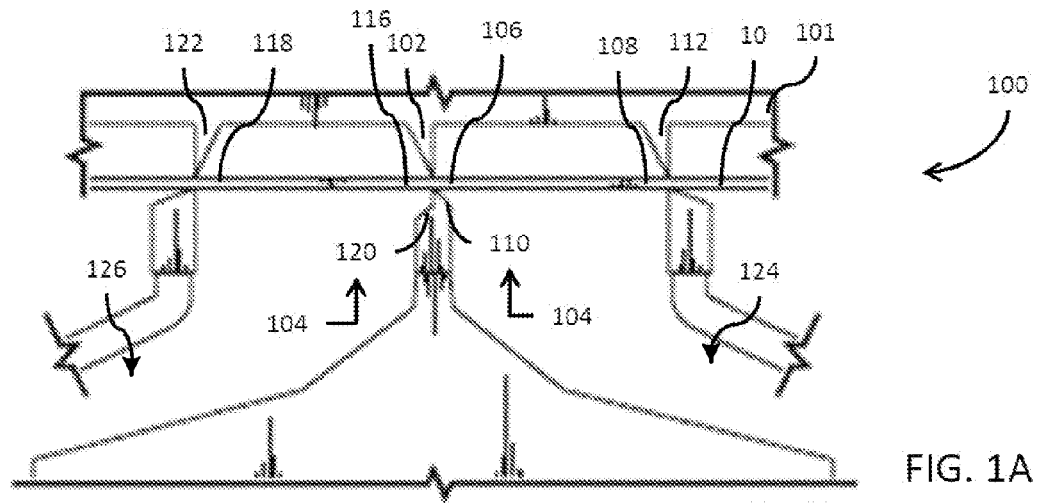
FIGS. 1A, 1B and 1C depict examples of schematic representations of operational sequences of an apparatus.

The drawings are not necessarily to scale and may be illustrated by phantom lines, diagrammatic representations and fragmentary views. In certain instances, details not necessary for an understanding of the embodiments (and/or details that render other details difficult to perceive) may have been omitted.

DETAILED DESCRIPTION OF EXEMPLARY EMBODIMENT(S)

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the examples as oriented in the drawings. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments (examples) aspects and/or concepts defined in the appended claims. Hence, specific dimensions and other physical characteristics relating to the embodiments disclosed herein are not to be considered as limiting, unless the claims expressly state otherwise.

Referring to all of the FIGS, generally speaking, the apparatus 100 includes (and is not limited to): a cutting assembly 102, and scrap-guiding regions 104. The cutting assembly 102 is configured to cut an object 10, such as an automotive part (sheet metal, etc.) The scrap-guiding regions 104 are positioned on opposite sides of the cutting assembly 102.

Figure 1B:
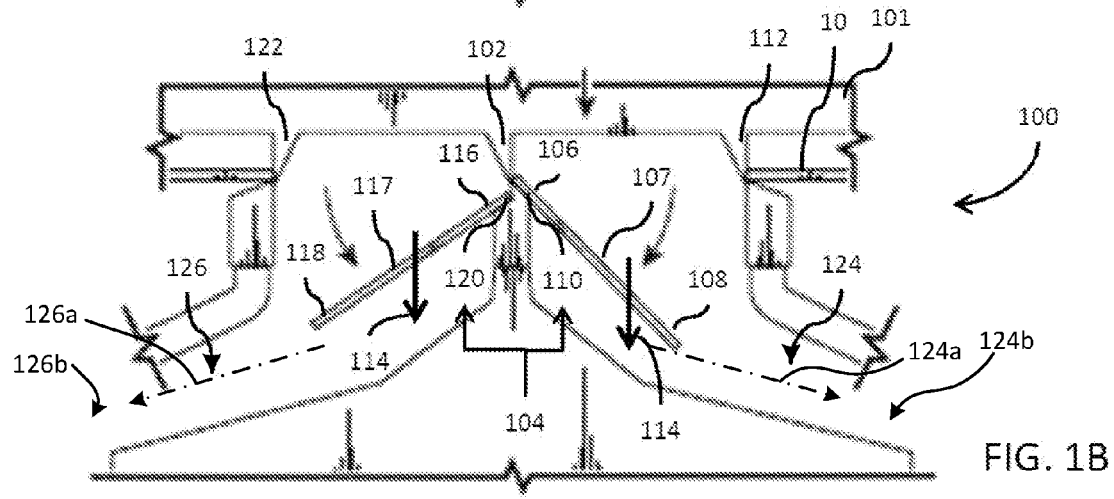
Figure 1C:
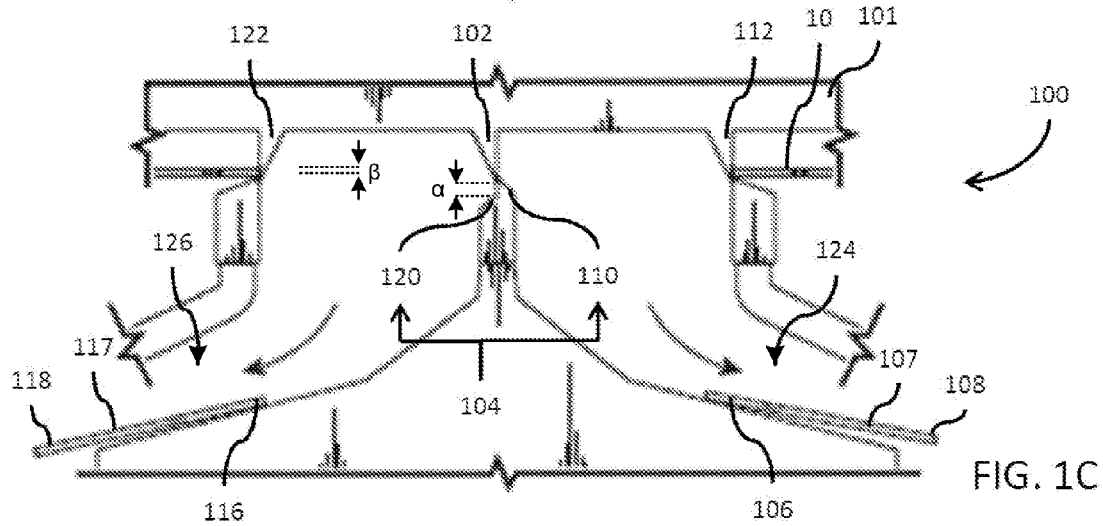

Referring now to FIGS. 1A, 1B, 1C, depicted are the examples of the schematic representations (a cross-sectional view) of the operational sequences of the apparatus 100. The operational sequence includes (and is not limited to): placing the object 10 relative to the apparatus 100, cutting scrap material from the object 10, and removing the scrap material away from the object 10. FIG. 1A depicts the object 10 positioned relative to the apparatus 100 prior to cutting (trimming) of the object 10. FIG. 1B depicts the apparatus 100 cutting (with partial removal of) the scrap material from the object 10. FIG. 10 depicts further removal of the scrap material away from the object 10.

Referring now to FIG. 1A, the cutting assembly 102 is configured to cut a first scrap portion 106 from the object 10. The first scrap portion 106 has a second scrap portion 108 extending from the first scrap portion 106. The scrap-guiding regions 104 include a first scrap-guiding region 110 configured to guide the first scrap portion 106 so as to permit removal of the second scrap portion 108 that is cut from the object 10 before removal of the first scrap portion 106 that is cut from the object 10. As well, a first cutter assembly 112 is configured to cut the second scrap portion 108 from the object 10. The first cutter assembly 112 is set apart from the cutting assembly 102 to one side of the first cutter assembly 112.

Referring now to FIG. 1B, once the second scrap portion 108 is cut from the object 10, the second scrap portion 108 moves under influence of a removal force 114. The removal force 114 is configured to urge movement of the second scrap portion 108 (away from the object 10). By way of example, the removal force 114 includes gravitational force. The first scrap portion 106 and the second scrap portion 108 are part of the first cut piece 107 that drops through the first chute assembly 124, which extends from a location adjacent the first scrap guiding region 110, wherein the location is laterally inwardly from the first cutter assembly 112, in a first direction 124*a* away from the first scrap guiding region 110 toward a first exit region 124*b* laterally outwardly spaced from and below the first cutter assembly 112, and is configured to receive the second scrap portion before receiving the first scrap portion.

Referring back to FIG. 1A, the cutting assembly 102 is further configured to cut a third scrap portion 116 from the object 10. The third scrap portion 116 has a fourth scrap portion 118 extending from the third scrap portion 116. The scrap-guiding regions 104 include a second scrap-guiding region 120 that is configured to guide the third scrap portion 116 so as to permit removal of the fourth scrap portion 118 that is cut from the object 10 before removal of the third scrap portion 116 that is cut from the object 10. As well, a second cutter assembly 122 is configured to cut the fourth scrap portion 118 from the object 10.

The cutting assembly 102, the first cutter assembly 112, and the second cutter assembly 122 each have upper cutting portions and lower cutting portions that are positioned in such a way that each of the upper cutting portions and the lower cutting portions are positioned to opposite sides of the object 10 when the object 10 is placed (positioned) between the cutting assembly 102, the first cutter assembly 112, and the second cutter assembly 122 (in order to be cut).

Referring now to FIG. 1B, once the fourth scrap portion 118 is cut from the object 10, the fourth scrap portion 118 moves under influence of the removal force 114 configured to urge movement of the fourth scrap portion 118. Once again, by way of example, the removal force 114 includes gravitational force. The third scrap portion 116 and the fourth scrap portion 118 are part of the second cut piece 117 that drops through the second chute assembly 126, which extends from a location adjacent the second scrap guiding region 120, wherein the location is laterally inwardly from the second cutter assembly 122, and in a second direction 126*a* toward a second exit region 126*b* laterally outwardly spaced from and below the second cutter assembly 122, and opposite the first direction 124*a*, and is configured to receive the fourth scrap portion before receiving the third scrap portion.

It will be appreciated that in accordance with one option, the apparatus 100 operates in such a manner that the cutting assembly 102, the first cutter assembly 112, and the second cutter assembly 122 cut the object 10 at the same time; however, in accordance with another option, a difference in time of when the cutting assembly 102, first cutter assembly 112 and second cutter assembly 122 operate to cut the object 10 is also contemplated.

Referring back to FIG. 1B, a first chute assembly 124 is configured to receive the second scrap portion 108 before receiving the first scrap portion 106. Once the first scrap portion 106 and the second scrap portion 108 are cut from the object 10, the first chute assembly 124 guides (directs) movement of the first scrap portion 106 and the second scrap portion 108 away from the object 10. A second chute assembly 126 is configured to receive the fourth scrap portion 118 before receiving the third scrap portion 116. Once the third scrap portion 116 and the fourth scrap portion 118 are cut from the object 10, the second chute assembly 126 guides (directs) movement of the first scrap portion 106 and the second scrap portion 108 away from the object 10. As depicted in FIG. 1C, the first chute assembly 124 direct scrap material away from the object 10 along a direction that is an opposite direction from a direction in which the second chute assembly 126 directs scrap material away from the object 10. As a result, of operating the cutting assembly 102, the first cutter assembly 112 and the second cutter assembly 122, the first cut piece 107 and the second cut piece 117 are cut away from the object 10.

It will be appreciated that in view of the description provided for FIGS. 1A, 1B, 1C, a method is disclosed. The method includes (and is not limited to) the following operations. An operation (A) includes cutting the first scrap portion 106 from an object 10, in which the first scrap portion 106 has the second scrap portion 108 extending from the first scrap portion 106. An operation (B) includes cutting the second scrap portion 108 from the object 10. An operation (C) includes removing the second scrap portion 108 cut from the object 10 before removing the first scrap portion 106 cut from the object 10. An operation (D) includes cutting the third scrap portion 116 from the object 10, in which the third scrap portion 116 has the fourth scrap portion 118 extending from the third scrap portion 116. An operation (E) includes cutting the fourth scrap portion 118 from the object 10. An operation (F) includes removing the fourth scrap portion 118 cut from the object 10 before removing the third scrap portion 116 cut from the object 10. An operation (G) includes moving the second scrap portion 108, once the second scrap portion 108 is cut from the object 10, under influence of the removal force 114 configured to urge movement of the second scrap portion 108. An operation (H) includes moving the fourth scrap portion 118, once the fourth scrap portion 118 is cut from the object 10, under influence of the removal force 114 configured to urge movement of the fourth scrap portion 118. An operation (I) includes receiving the second scrap portion 108 in the first chute assembly 124 before the first chute assembly 124 receives the first scrap portion 106. An operation (J) includes receiving the fourth scrap portion 118 in the second chute assembly 126 before the second chute assembly 126 receives the third scrap portion 116. An operation (K) includes receiving the second scrap portion 108 in the first chute assembly 124 before the first chute assembly 124 receives the first scrap portion 106. An operation (L) includes receiving the fourth scrap portion 118 in the second chute assembly 126 before the second chute assembly 126 receives the third scrap portion 116. An optional operation is an operation (M) that includes directing scrap material along the first chute assembly 124 and away from the object 10 along the direction that is an opposite direction from the direction in which the second chute assembly 126 directs scrap material away from the object 10.

In view of the description associated with FIGS. 1A, 1B, 1C, the apparatus 100, generally speaking, includes (but is not limited to): a first means for cutting, a second means for cutting, and a third means for removing. The first means is for cutting the first scrap portion 106 from the object 10, and the first scrap portion 106 has the second scrap portion 108 extending from the first scrap portion 106. The second means is for cutting the second scrap portion 108 from the object 10. The third means is for removing the second scrap portion 108 cut from the object 10 before removing the first scrap portion 106 cut from the object 10. By way of example, the first means for cutting includes the cutting assembly 102. By way of example, the second means for cutting includes the first cutter assembly 112. By way of example, the third means for removing includes the removing removal force 114 in combination with the scrap-guiding regions 104 of the cutting assembly 102. In addition, included as well is a fourth means for cutting the fourth scrap portion 118 from the object 10, in which wherein the first means for cutting includes cutting a third scrap portion 116 from the object 10 (the third scrap portion 116 having a fourth scrap portion 118 extending from the third scrap portion 116), and the third means includes removing the fourth scrap portion 118 cut from the object 10 before removing the third scrap portion 116 cut from the object 10. An example of the fourth means for cutting is the second cutter assembly 122.

Referring to FIGS. 1A, 1B, 1C, the apparatus 100 has cut the object 10 into the first cut piece 107 and the second cut piece 117. The first chute assembly 124 and the second chute assembly 126 are positioned below (in relative terms) and on either side of cutting assembly 102. The second chute assembly 126 and the first chute assembly 124 are adjacent of the cutting assembly 102, generally opposite to one another, and in particular the second chute assembly 126 is shown to the left side of the cutting assembly 102, and the first chute assembly 124 is shown to the right side of cutting assembly 102.

In use (operation), the object 10 is positioned or placed proximate to the cutting assembly 102, the first cutter assembly 112 and the second cutter assembly 122 by way of a placement device or system (not depicted but known). As cutting of the object 10 occurs, a cutting edge of the cutting assembly 102 contacts the object 10. With the application of sufficient force, the object 10 is cut (divided) by the cutting edge 214 into the first cut piece 107 and the second cut piece 117. The frame assembly 101, which is configured to support the upper sections of the cutting assembly 102, the first cutter assembly 112 and the second cutter assembly 122, translates downwardly so as to cause the cutting of the object 10 once the upper and lower portions of the cutting assembly 102, the first cutter assembly 112 and the second cutter assembly 122 respectively engage with each other. The second scrap portion 108 and the fourth scrap portion 118 are consequently unable to maintain their respective horizontal orientations due to the effect of gravity acting on the second scrap portion 108 and the fourth scrap portion 118, and thus the second scrap portion 108 and the fourth scrap portion 118 experience free-fall decent into the first chute assembly 124 and the second chute assembly 126 (respectively).

The frame assembly 101 in combination with the second scrap-guiding region 120 and the first scrap-guiding region 110 are configured to temporarily hold onto the third scrap portion 116 and the first scrap portion 106 (respectively) so as to temporarily delay movement of the third scrap portion 116 and the first scrap portion 106 from going to free fall long enough so that in this way, the second scrap portion 108 and the fourth scrap portion 118 experience free fall by way of the pull of gravity before the first scrap portion 106 and the third scrap portion 116 experience free fall by way of the pull of gravity. In this way, the first cut piece 107 and the second cut piece 117 rotate (as least in part) as the first cut piece 107 and the second cut piece 117 drop downwardly into the first chute assembly 124 and the second chute assembly 126 (respectively) as the first scrap portion 106 and the third scrap portion 116 are slidably guided by the first scrap-guiding region 110 and the second scrap-guiding region 120 (respectively) away from the cutting assembly 102. In this manner, the dropping orientation of first cut piece 107 and the second cut piece 117 is adjusted to (advantageously) repeatedly and reproducibly accommodate unobstructed and unimpeded passage through the first chute assembly 124 and the second chute assembly 126 (respectively).

Figure 2:
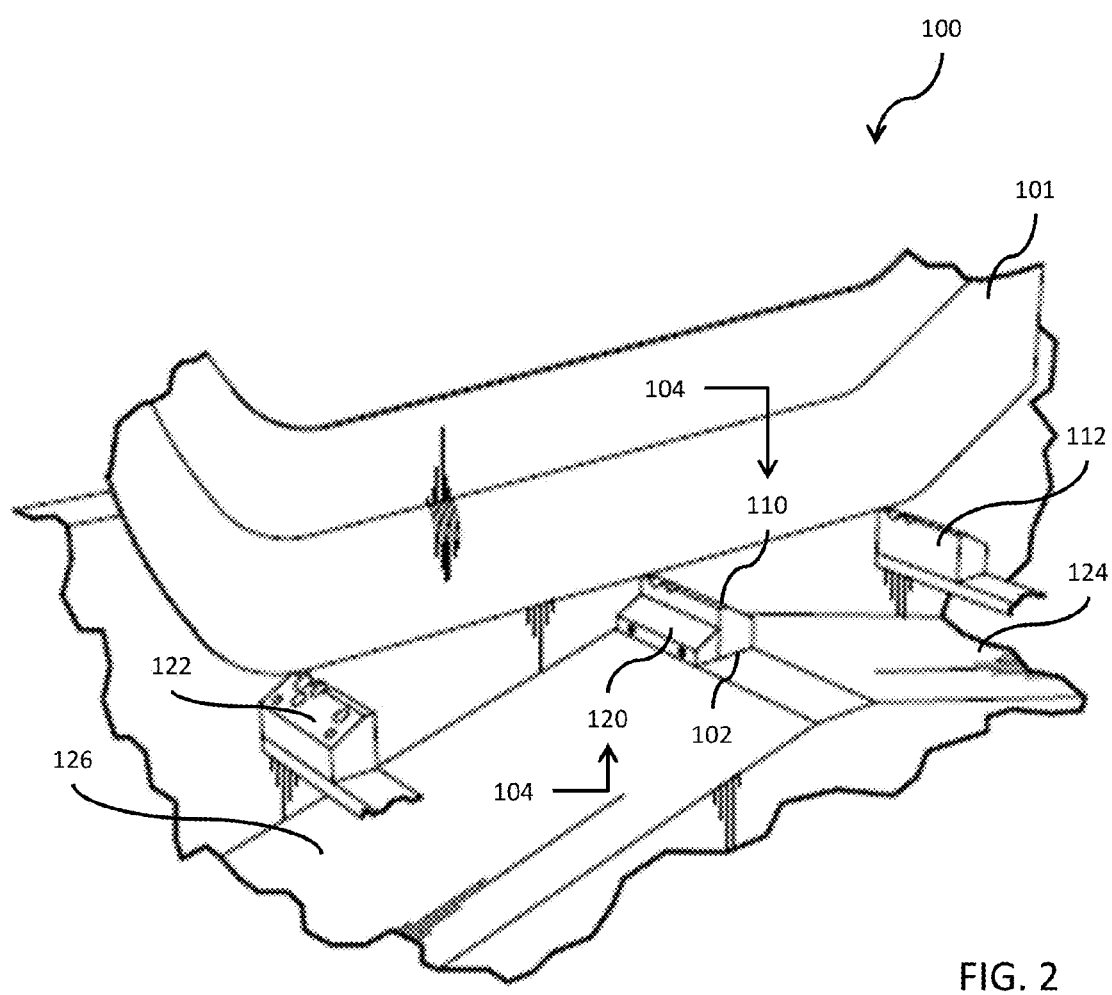
FIG. 2 depicts an example of a perspective view of the apparatus of FIGS. 1A, 1B, 1C.

FIG. 2 is a perspective view of the exemplary apparatus 100 of FIGS. 1A, 1B, 1C. The upper cutting portions of the cutting assembly 102, the first cutter assembly 112 and the second cutter assembly 122 are not depicted in FIG. 2 for the sake of simplifying FIG. 2.

Figure 3A:
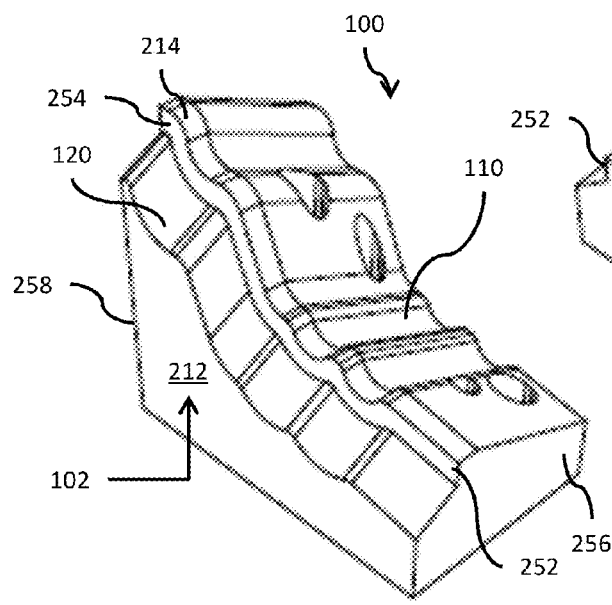
FIGS. 3A and 3B depict examples of perspective views of a cutter assembly of the apparatus of FIG. 1.
Figure 3B:
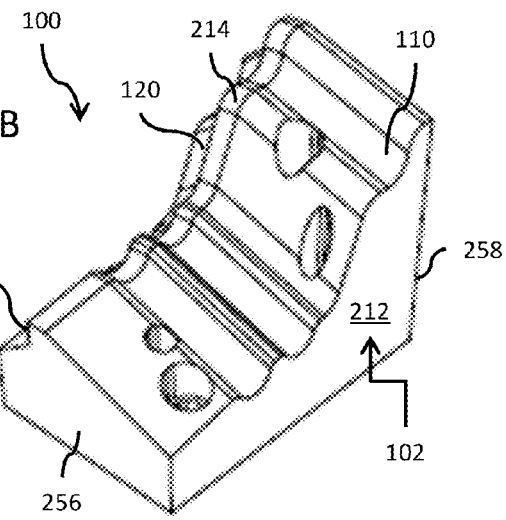

FIGS. 3A, 3B are perspective views of the exemplary cutting assembly 102 of the apparatus 100 of FIG. 1. What is depicted is the lower cutting portion of the cutting assembly 102. The opposite cutting portion of cutting assembly 102 (not depicted) may include or may have similar but opposite shape or profile associated with the profile of the lower portion of the cutting assembly 102 (that is depicted in FIGS. 3A, 3B). The cutting assembly 102 includes a cutting body 212, a cutting edge 214. The second scrap-guiding region 120 and the first scrap-guiding region 110 are positioned on opposite sides of the cutting edge 214. The cutting body 212 may be integrally formed or not integrally formed. The first scrap-guiding region 110 extends from cutting edge 214 and slopes away from cutting edge 214. The second scrap-guiding region 120 and the first scrap-guiding region 110 have generally opposite slopes. The second scrap-guiding region 120 is positioned opposite from the first scrap-guiding region 110 relative to the cutting edge 214, extends from below cutting edge 214 and slopes away from cutting edge 214 with a slope opposite to the slope of first scrap-guiding region 110.

Alternatively, the slopes of second scrap-guiding region 120 and the first scrap-guiding region 110 can have different magnitudes although it is preferred to have slopes that complement the direction and degree of guidance desired for guiding the first cut piece 107 and the second cut piece 117 (of FIG. 1B) through the second chute assembly 126 and the first chute assembly 124 in an unobstructed fashion (that is without becoming jammed in the first chute assembly 124).

A vertical offset 252 is also formed in the cutting body 212 that extends between an inner edge 254 of the second scrap-guiding region 120 and cutting edge 214 and between a front end 256 and a back end 258 of cutting body 212. As described further below, and shown in FIG. 1C, vertical offset 252 has a vertical depth α that corresponds at least to two times the thickness (in this case a designated thickness as shown at β) of the object 10 to be cut. For example, for the case where the object 10 includes a sheet of metal of up to 0.7 millimeters (mm) of thickness, the vertical offset 252 may be in the range of 1.5 mm to 1.0 mm that has been observed to yield particularly preferable results.

The second scrap-guiding region 120 and the first scrap-guiding region 110 are depicted in FIGS. 3A, 3B as having profiles that are dimensioned to correspond with the profile of the cutting edge 214. The cutting edge 214 as well may correspond with a profile of the object 10 to be cut. In this manner, deformation of the object 10 (especially for the case where the object 10 includes a metal sheet) is limited as the object 10 is cut. The cutting edge 214 includes a cutting profile corresponding, at least in part, to the profile of the object 10. As depicted, the second scrap-guiding region 120 includes a part-guiding profile corresponding, at least in part, to the profile of the object 10. The first scrap-guiding region 110 includes a part-guiding profile corresponding, at least in part, to the profile portion of the object 10.

Figure 3C:
FIG. 3C depicts an example of a perspective view of the cutting assembly of FIGS. 3A and 3B.

FIG. 3C is a perspective view of the exemplary cutting assembly 102 of FIGS. 3A and 3B. The upper cutting portions of the cutting assembly 102 are not depicted in FIG. 3 for sake of simplifying FIG. 3

It will be appreciated that examples of the object 10 may include (but is not limited to): formed sheets of material, a plate of metal, a slab, a film, a textile, rubber, plastic, glass, metal, wood, paper and/or cardboard based material. Those of ordinary skill in the art will also appreciate that guiding the first cut piece 107 and the second cut piece 117 includes any and all events involving adjusting, altering or otherwise modifying paths, courses, direction, routes or trajectories of falling parts that are cut as described above and which can also include, scrap metal cut from metal that is pressed, stamped or otherwise formed for use in automobile assemblies and/or other similar vehicular transportation assemblies.

It will be appreciated that the meaning of the term "scrap" includes: (A) a small piece or amount of something or a fragment, (B) a piece that is left over after the greater part has been used or processed, and/or (C) discarded waste material, especially metal suitable for reprocessing. It will be appreciated that the term "scrap" is not merely limited to merely objects that are to be discarded as wastage.

ADDITIONAL DESCRIPTION

According to a specific example, the apparatus 100 includes the cutting assembly 102 configured as a dual tilt scrap cutter that may be used for forming metallic objects, such as sheet metal, etc. According to one option, addendum geometry (profile geometry associated with the object 10) may be incorporated in the cutting assembly 102. The cutting assembly 102 advantageously improves directional flow of cut pieces, such as the first cut piece 107 and the second scrap portion 108. The cutting assembly 102 may be used or positioned between other cutters associated with trim die assemblies associated with metal-forming operations (and the like).

For the case where the cutting assembly 102 includes the first scrap-guiding region 110 and the second scrap-guiding region 120 (located on opposite sides of the cutting assembly 102), the first scrap-guiding region 110 and the second scrap-guiding region 120 are each configured to guide the flow of scrap or cut portions in a more repeatable direction. Without the first scrap-guiding region 110 and second scrap-guiding region 120, the cut portions or scrap pieces may inadvertently bounce off the first chute assembly 124 and the second chute assembly 126 in ways that are unpredictable. That is, the problem associated with known cutters is that from time to time, the cut portions or scrap pieces become accidentally jammed in a cute assembly thereby causing unwanted down time for metal forming operations associated with removing the jammed pieces.

For the case where the cutting assembly 102 includes or uses addendum geometry (profile of the object 10) on both the first scrap-guiding region 110 and the second scrap-guiding region 120, the flow of cut pieces or cut portions is further improved. For the case where three dimensional shapes (addendum geometry or profile) are used or associated with the object to be cut or trimmed, incorporating the same or similar geometry on both sides of the cutting assembly 102 improves the flow of the scrap pieces away from the cutting assembly 102. For the case where the cutting assembly 102 includes or uses addendum geometry (profile of the object 10) on both the first scrap-guiding region 110 and the second scrap-guiding region 120 (both sides of the cutting assembly 102), the first scrap-guiding region 110 and the second scrap-guiding region 120 are each configured to guide the flow of scrap or cut portions in a more repeatable fashion.

It may be appreciated that the assemblies and modules described above may be connected with each other as may be required to perform desired functions and tasks that are within the scope of persons of skill in the art to make such combinations and permutations without having to describe each and every one of them in explicit terms. There is no particular assembly, components, or software code that is superior to any of the equivalents available to the art. There is no particular mode of practicing the disclosed subject matter that is superior to others, so long as the functions may be performed.

It is believed that all the crucial aspects of the disclosed subject matter have been provided in this document. It is understood that the scope of the present invention is limited to the scope provided by the independent claim(s), and it is also understood that the scope of the present invention is not limited to: (i) the dependent claims, (ii) the detailed description of the non-limiting embodiments, (iii) the summary, (iv) the abstract, and/or (v) description provided outside of this document (that is, outside of the instant application as filed, as prosecuted, and/or as granted). It is understood, for the purposes of this document, the phrase "includes (and is not limited to)" is equivalent to the word "comprising." It is noted that the foregoing has outlined the non-limiting embodiments (examples). The description is made for particular non-limiting embodiments (examples). It is understood that the non-limiting embodiments are merely illustrative as examples.

What is claimed is:

1. An apparatus, comprising:
a cutting assembly comprising a cutting body having a cutting edge and being configured to cut an object;
scrap-guiding regions being positioned on opposite sides of the cutting assembly, the scrap-guiding regions including a first scrap-guiding region extending from below the cutting edge and sloping away from the cutting edge, the first scrap-guiding region configured to guide a first cut piece being cut from the object away from the cutting edge; and a second scrap-guiding region located opposite the first scrap-guiding region, the second scrap-guiding region extending from below the cutting edge and sloping away from the cutting edge, the second scrap-guiding region configured to guide a second cut piece being cut from the object away from the cutting edge; the first and second scrap-guiding regions being fixed relative to the cutting edge;
the first cut piece including a first scrap portion and a second scrap portion extending therefrom, and the second cut piece including a third scrap portion and a fourth scrap portion extending therefrom;
wherein:
the cutting body is configured to cut the first scrap portion from the object, and further comprising a first cutter assembly spaced from the cutting body and configured to cut the second scrap portion from the object; and
the first scrap-guiding region is configured to guide the first scrap portion so as to permit removal of the second scrap portion before removal of the first scrap portion;
the cutting body is further configured to cut the third scrap portion from the object, and further comprising a second cutter assembly spaced from the cutting body and opposite the first cutter assembly and configured to cut the fourth scrap portion from the object;
the second scrap-guiding region is configured to guide the third scrap portion so as to permit removal of the fourth scrap portion before removal of the third scrap portion;
a first chute assembly extends in a first direction away from the first scrap guiding region toward a first exit region laterally outwardly spaced from and below the first cutter assembly, and is configured to receive the second scrap portion before receiving the first scrap portion; and
a second chute assembly extends in a second direction away from the second scrap guiding region toward a second exit region laterally outwardly spaced from and below the second cutter assembly, and is configured to receive the fourth scrap portion before receiving the third scrap portion.

2. The apparatus of claim 1, wherein once the second scrap portion is cut from the object, the second scrap portion moves under influence of a removal force configured to urge movement of the second scrap portion.

3. The apparatus of claim 2, wherein the removal force includes gravitational force.

4. The apparatus of claim 1, wherein once the fourth scrap portion is cut from the object, the fourth scrap portion moves under influence of a removal force configured to urge movement of the fourth scrap portion.

5. The apparatus of claim 4, wherein the removal force includes gravitational force.

6. The apparatus of claim 1, further comprising a vertical offset between the first and second scrap-guiding regions.

7. The apparatus of claim 6, wherein the object has a designated thickness in a region to be cut, and wherein the vertical offset is at least two times a designated thickness value of the object.

* * * * *